Sept. 24, 1940.　　　B. C. PLACE　　　2,216,047
SECURING MOLDINGS
Original Filed March 21, 1936
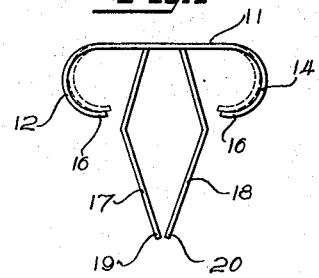
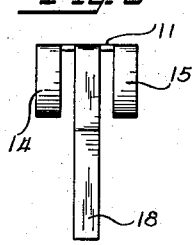
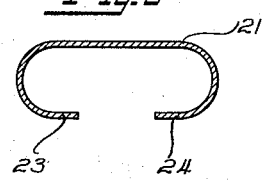
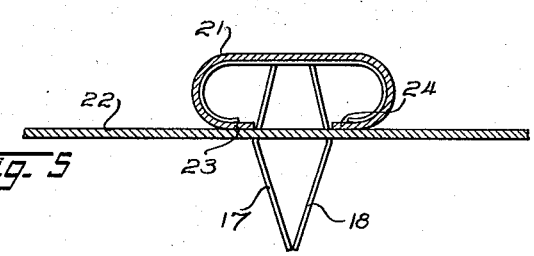
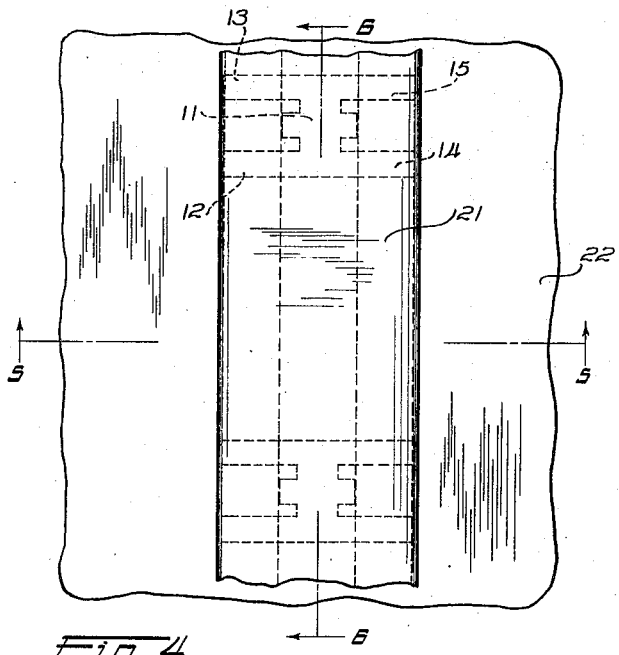
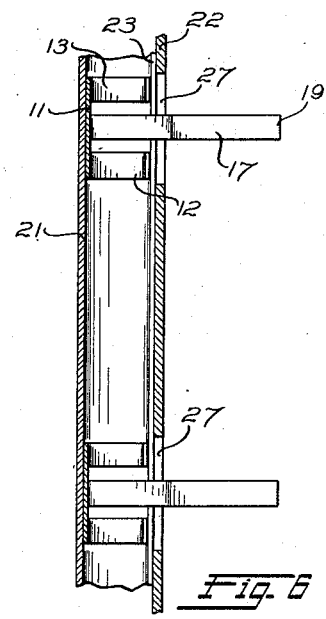
Inventor
Bion C. Place
By Strauch & Hoffman
Attorneys Patented Sept. 24, 1940

2,216,047

UNITED STATES PATENT OFFICE 2,216,047

SECURING MOLDINGS

Bion C. Place, Detroit, Mich., assignor of one-half to George E. Gagnier, Detroit, Mich.

Original application March 21, 1936, Serial No. 70,119. Divided and this application October 20, 1937, Serial No. 170,103

2 Claims. (Cl. 189—88)

The present invention involves a novel way of satisfactorily securing hollow moldings upon a metallic or like supporting structure, by means of spring fasteners, the entering parts of which are snapped in perforations in said structure. More particularly, the invention is concerned with a novel combination of molding and spring fasteners, constructed of sheet metal in such manner that the heads of the fasteners firmly engage opposite walls of the hollow molding, regardless of the type thereof, and said fasteners having shanks or entering parts that possess satisfactory holding power, in spite of the fact that the fasteners may be constructed of relatively inexpensive thin sheet metal.

This application is a division of application Serial No. 70,119, filed March 21, 1936.

The principal purpose of the present invention is to facilitate the attachment of hollow moldings of relatively great height to the support for the moldings, and to secure said moldings in such manner that they are firmly, but yieldingly, held upon the support by spring fasteners so constructed and associated with the moldings, that the engagement of the entering parts of the fasteners with the walls of the perforations in the supporting structure, takes place at points approximately midway of the length of the protruding shanks of the fasteners, whereby the holding effect of the fasteners is enhanced and relative movement between the fasteners and molding prevented.

A further object of the invention is to secure hollow moldings by fasteners that bear against a substantial area of the inside of the top wall of the molding, which fasteners are adequately maintained against said inside of the molding by a multiplicity of arms that engage an opposite wall or walls of the molding, and which fastener includes long outwardly bowed legs depending approximately centrally between said arms and passing outwardly between the inturned flanges of the molding.

Still another object of the invention is to secure moldings by fasteners constructed from relatively thin sheet metal, provided with satisfactory holding power by disposing the outwardly bowed legs, constituting the entering part or shank of the fastener directly opposite each other, and arranging the ends of the outwardly bowed legs remote from the head that carries them so that they are in close proximity to each other in order that, when the legs are entered in the perforation or socket, said ends are brought into firm contact, thus very substantially increasing the power of said legs to retain the molding upon its support and eliminate looseness between the fasteners, the support, and the molding.

Still further objects of the invention will appear in the course of the description of preferred embodiments of the invention, which embodiments are described with reference to the accompanying drawing in which:

Figures 1 and 2 are respectively side and edge views of a preferred form of fastener forming a part of the present invention.

Figure 3 is a sectional view of an oval molding such as may be satisfactorily secured by the fastener of Figures 1 and 2.

Figure 4 is a fragmentary plan view of the hollow molding applied to a fragment of a support by means of the fastener illustrated in Figures 1 and 2.

Figure 5 is a sectional view taken on the plane indicated by the lines 5—5 looking in the direction of the arrows.

Figure 6 is a sectional view taken on the plane indicated by the lines 6—6 of Figure 4.

Like reference characters indicate like parts throughout the several figures.

The fastener illustrated in Figures 1 and 2 is constructed from sheet metal by stamping or punching the blank necessary to produce the fastener from a sheet of metal, and properly tempering the blank after it has been bent into the form illustrated in said figures. As illustrated in said figures, the fastener comprises a flat body 11, preferably of elongated rectangular form, said body being intended to bear against the inside of the top wall of a hollow molding over a substantial area of said wall, so that when pressure is applied to the molding in order to force the entering part of the fastener, presently to be referred to, into the perforation or socket in the support it will be distributed over a substantial area of the molding, thus preventing distortion or marring of the molding by forcing the fastener to make a groove or indentation in said outer wall during the application of said pressure. Arms 12, 13, 14 and 15 depend from the four corners of the rectangular body 11, preferably from the long sides of said body as illustrated. Said arms are flexible and the ends 16 thereof are preferably curved inwardly, as illustrated. Two outwardly bowed legs 17 and 18 depend from the same side of the body 11 as said arms, said legs constituting the shank or entering part of the spring fastener. The legs 17 and 18 are disposed directly opposite each other, and the ends 19 and 20 of said legs, remote from the body 11, are brought into close proximity to each other so that when the entering part of the fastener is sprung in the perforation in the supporting structure in the manner presently to be described, said ends 19 and 20 firmly contact with each other, thus multiplying the holding power of said shank or entering part.

The fastener just described is used to secure a hollow molding, such as the molding 21 illustrated in Figures 3, 4 and 5, in a novel manner upon a suitable supporting structure 22. The molding 21 has relatively great height, as illustrated, and is of oval form. Inturned flanges 23 and 24 are formed on said molding 21. The fastener of Figures 1 and 2 is constructed so that the width of the head of the fastener measured across the arms 12 and 14, or 13 and 15, exceeds somewhat the internal width of the molding measured between the side walls. The fasteners are assembled with respect to the molding by inserting them in an open end and sliding them along the length of the molding, the arms 12, 13, 14 and 15 being pressed inwardly sufficient, in the manner indicated in dotted lines in Figure 1, to enable the head of the fastener to be entered therein. The fastener is also designed so that when said arms 12, 13, 14 and 15 are pressed somewhat toward each other and toward the body 11 in entering them in the molding, the body 11 of the head is firmly forced into contact with the inside of the top wall thereof, so that, when the fastener is in assembled relation, the head thereof bears firmly against the inside of the top wall and the ends 16 of the arms 12, 13, 14 and 15 bear against the inside of the inturned flanges 23 and 24, said arms being placed under some tension to insure a firm engagement between the molding, said body, and the ends of said arms. The fastener is slid to the proper position along the length of the molding and will remain in said position in view of said firm engagement. The legs 17 and 18 project between the inturned flanges 23 and 24 and extend substantially beyond the molding as illustrated. A number of fasteners are assembled in spaced relation within the hollow molding in the manner just stated.

The molding is then ready to be applied to the support 22, which is provided with perforations 27 for the reception of the entering parts of the fastener, comprising the legs 17 and 18 as before stated. In securing the molding the protruding entering parts of the fasteners are forced through the perforations 27 by applying pressure to the outer wall of the molding 21. In view of the wide area of said wall covered by the body 11 of the head, it will be understood that, as above stated, the molding will not be marred even by exerting substantial pressure in causing the entering part to enter said perforations. When the legs 17 and 18 are forced in said perforations the wedge, formed by their ends remote from the head, will first cause said legs to firmly contact at the ends of the shank of the fastener, and a subsequent flattening of the legs will occur to permit the shank to be passed through said perforation, the over-all width of the shank at its point of maximum outward bowing substantially exceeding the diameter of the opening 27. After the point of maximum outward bowing has been passed through the perforations 27, the legs tend to resume their original form and firmly engage the inner corner of the perforations 27 serving to retain the molding upon the support 22 in a manner that will be obvious to those skilled in the art.

It will be observed that the legs 17 and 18 contact at the ends of the shank of the fastener and bend at the point of their connection to the body 11, which point, it will be observed, is disposed substantially above the supporting structure 22. In view of this and the height of the molding, which brings the point of maximum outward bowing of the legs close to the plane of the molding flanges, the legs 16 and 17 have a high degree of resilience at the points at which they contact with the inner corner of the perforation 26, thus providing a firm, though resilient, engagement between said legs and said corner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a hollow molding having a top wall, side walls and spaced inturned flanges, and spring fasteners spaced at intervals along said molding for securing said molding to a support, said fasteners each including a continuous part yieldingly bearing snugly against the inside of the top wall of said molding over a substantial area, and resilient arms sustaining said part against said top wall, each arm having an intermediate surface bearing against the adjacent side wall of the molding and an inturned terminal portion having a surface bearing on the inside of the adjacent flange, whereby the fastener adjusts itself in said molding regardless of slight variations in the height and width of the molding, and an expansible and contractible shank protruding from said molding between said flanges 2. In combination, a hollow molding having a top wall, arcuate side walls and spaced inturned flanges, and spring fasteners spaced at intervals along said molding for securing said molding to a support; said fasteners each including a laterally and longitudinally compressible head having a continuous part snugly engaging the inner surface of said top wall over a substantial area, resilient arms depending from said part having curved intermediate surface portions bearing against opposite inner side walls of the molding and inturned terminal surface portions bearing upon the insides of said flanges, and having a pair of outwardly bowed legs extending from said part through said flanges.

BION C. PLACE.